Patented Aug. 27, 1935

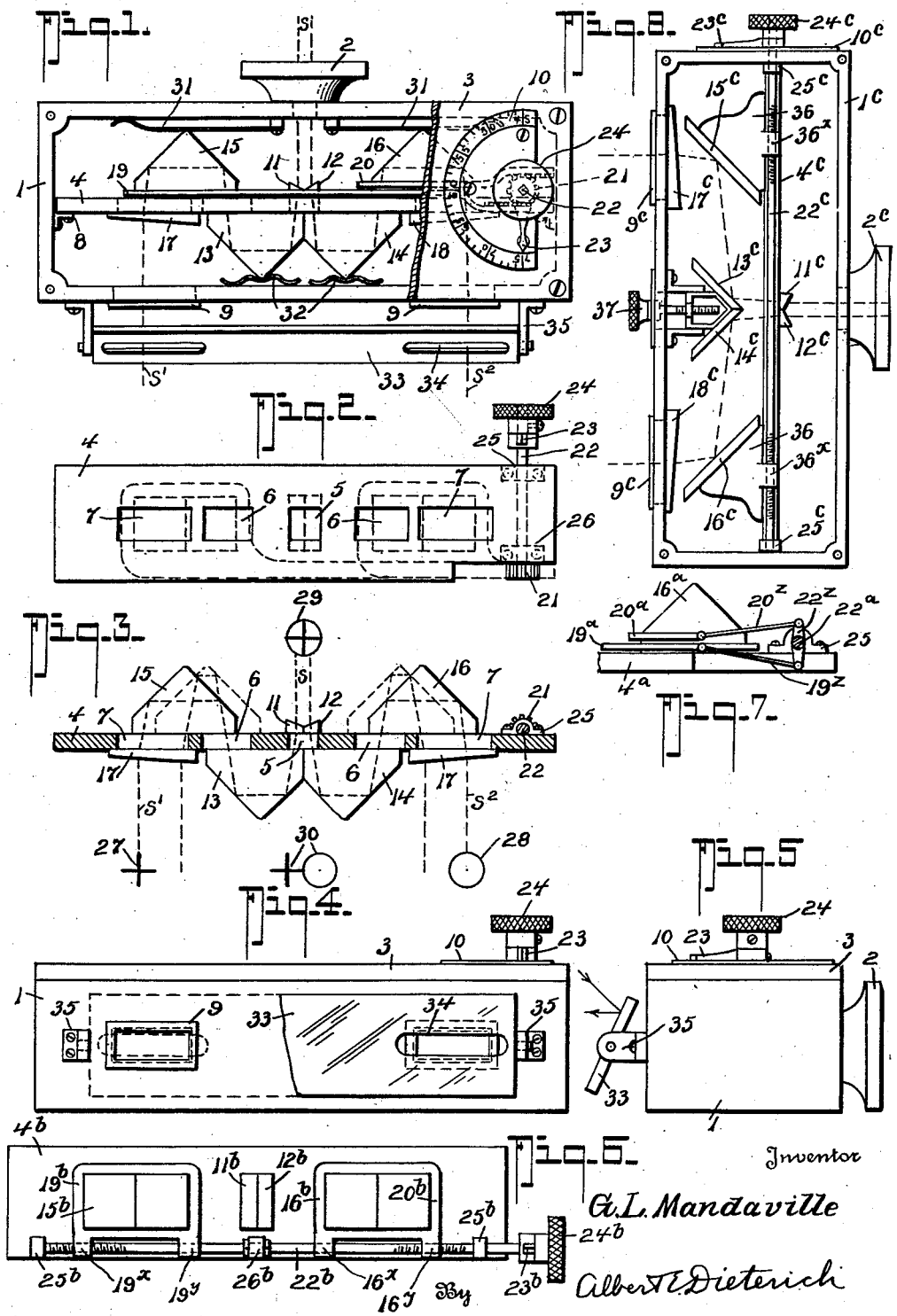

2,012,574

UNITED STATES PATENT OFFICE 2,012,574

PUPIL DISTANCE METER

Gurney Lee Mandaville, Fort Pierce, Fla.

Application February 14, 1934, Serial No. 711,237

9 Claims. (Cl. 88—20)

The invention has for its object to provide an instrument for the use of the optometrist, oculist and ophthalmologist, to find the exact pupillary width for the purpose of adjusting their instruments in making a refraction, or an examination of the visual and muscular functions of the human eye; also to provide an instrument designed to be used by dispensing opticians and frame-fitters, as the correction of refraction and muscular errors depends largely on the centering of the lenses over the pupils of the eyes of the patient.

Further, it is an object of the invention to provide an instrument for measuring the distance between the centers of the pupils of the human eyes and indicate the same on a dial in millimeters.

Further, the invention has for its object to provide such an instrument as will enable the operator accurately to measure the pupillary width at varying distances, i. e., the instrument can be focused at a near point—as in reading—and the measurement taken, or the eyes can be focused on a distant object and a measurement taken with parallel vision (this is now estimated to be at any point more than twenty feet away).

Further, it is an object to provide an instrument of the character stated which is so constructed that it is not necessary for the operator to be at any certain distance from the patient's eyes, thus eliminating this unpleasant feature of the instruments now in use, which require a given distance that in many cases is close enough to be in contact with the breath of the patient.

Further, the invention has for its object to provide an instrument whose design and construction is such as to make its use practical by its simplicity, as the results of the measurements are computed and indicated on the dial so they may be plainly read to a fraction of a millimeter. Guess-work is thus eliminated, the taking of the measurements being so simple that with a few minutes' instruction anyone can take them as accurately as though he had years of experience.

Other objects will in part be obvious and in part be pointed out hereinafter.

To the attainment of the aforesaid objects and ends the invention still further resides in the novel details of construction, combination and arrangement of parts; all of which will be first fully described in the following detailed description and then be particularly pointed out in the appended claims, reference being had to the accompanying drawing, in which:—

Figure 1 is a top plan view of the instrument, a part of the cover being broken away.

Figure 2 is an elevation of the main plate or mechanism support, the prisms being omitted and the movable prism carriers being indicated in dotted lines.

Figure 3 is a central vertical longitudinal section of the mechanism support and the parts cooperative therewith.

Figure 4 is an elevation of the instrument as viewed by the patient.

Figure 5 is an end elevation of the same.

Figure 6 is a plan view of a modified construction of the main plate or mechanism support illustrating a modified means for effecting the adjustment of the movable prisms.

Figure 7 is a detail view of another modification.

In Figure 8 is shown a plan of a modification of the invention hereinafter referred to, the cover of the box being removed.

In the drawing in which like numerals and letters of reference indicate like parts in all of the figures, 1 represents the case of the instrument which may be made of "bakelite", metal or other compositions. It is box-like in construction, allowing room freely to place the prisms and mechanisms assembled within. The box carries an eye-piece 2 which is placed in the center of one side of the case 1 which shall hereafter be referred to as the front of the case. The case is provided with a top or cover 3 which may be attached by means of screws or in any other suitable way.

The main plate or mechanism support 4 is suitably mounted at 8 within the box 1 parallel to the front and back walls thereof. It has an opening 5 in the center through which the visual rays $S^1$—$S^2$ pass convergingly from the right and left as $S^1$ and $S^2$. Two openings 6—6 are provided exactly equi-distant from the opening 5 and two other openings 7—7 are also provided equi-distant from the opening 5 but nearer the ends of the plate 4. The openings 7 are in line with the openings 5 and 6, but are longer.

Two openings 9—9 are provided in the back of the case through which the visual rays, $S^1$—$S^2$, pass on entering the instrument.

A dial 10 is mounted on the top of the case, on which are indicated the findings.

11 and 12 are a pair of prisms which combine in the visual ray S the two separate rays $S^1$ and $S^2$ which pass through the opening 5 in the plate 4. 13 and 14 are return prisms with the faces ground at right-angles to project the rays of light at the angle at which it enters. These prisms are made with one reflecting surface shorter than the other and the short ends are fitted accurately together, the joint being placed over the center of the opening number 5 (see Figures 1 and 3) into which the projected rays from prisms 13 and 14 enter.

The return prisms 13 and 14 are immovably held in place by stout friction springs 32 pressing against their apexes and holding the prisms against plate 4 with retaining friction, or any other suitable means may be provided for the purpose.

15 and 16 are the movable reflecting prisms whose reflecting surfaces are at right angles and both reflecting surfaces of a prism are of equal dimensions. These prisms are placed in the instrument so they can be moved parallel to the plate 4 by suitable mechanical means.

The rays $S^1$—$S^2$ coming through the opening 7 enter the prisms and are again projected through the opening 6. Prisms of equal degree, 17 and 18, receive the parallel visual ray portions $S^1$—$S^2$ respectively before they are projected through the opening 7 and cause the rays to converge.

The prisms 15 and 16 are held in contact with the plate 4 by springs 31 secured to the case 1.

Any suitable mechanism for simultaneously moving the prisms 15 and 16 toward and from each other in equal degree may be provided. I have shown in the accompanying drawing three ways of doing this, although other means will be obvious to those skilled in the art. By reference to Figures 1 to 3, inclusive, it will be seen that I provide two slidable frames 19 and 20, one carrying the prism 15 and the other carrying the prism 16. These slides are provided with rack portions that engage on opposite sides with a pinion 21 on an arbor 22 which is mounted in bearings 25 and 26 on the plate 4 and which carries a pointer 23 to cooperate with the graduated dial 10, and a thumb-piece 24 by which the arbor may be turned to effect a movement of the prisms 15 and 16 toward or from one another and toward and from the central line of the instrument in equal degree.

Instead of using the prism-moving means shown in Figures 1 and 2, the mechanism shown in Figure 6 may be employed. By reference to this figure it will be seen that the prism carriers 19b and 16b are provided with plain guide lugs 19y—16y and with threaded lugs 19x and 16x respectively to engage with the screw 22b, the latter having reversely pitched threads to engage the respective lugs 19x and 16x, so that when the screw 22b is turned in one direction the prisms 15b and 16b will be moved toward each other in equal degree, and when the shaft is turned in the opposite direction the prisms will be moved apart.

Instead of using the mechanism for moving the prisms which is shown in Figures 1, 2 and 6, the prisms may be moved by having their carriers 19a and 20a connected with the shaft 22a by a lever and rod arrangement 22z—20z—19z so that as the shaft 22a is turned the carriers 19a—20a will be moved in opposite directions.

The parts shown in Figure 6 which correspond to similar parts in Figures 1 to 3 inclusive bear the same reference numerals plus the index letter "b", while those in Figure 7 bear the same reference numeral plus the index letter "a".

The pointer 23 is secured to the arbor 22 in position to cooperate with the dial 10 to render the reading of the setting of the instrument easy. The arbor 22 is mounted on the plate 4 in suitable bearings 25 and 26.

27 and 28 represent experimental targets and 29 indicates the overlapping of targets 27 and 28 as seen by the operator when the instrument is adjusted to the exact distance between the two targets 27 and 28. 30 indicates the appearance of targets to the operator when the targets are a few millimeters farther apart than the distance indicated on the instrument.

On the rear of the box 1 I may mount a suitable mirror 33 having slots 34 to register with the openings 7, the mirror being mounted on stubs in bearing brackets 35 on the back of the box 1. The purpose of the mirror 33 is to reflect the source of illumination placed over the patient, or to one side of him, to illuminate the fundus, it being possible by this means plainly to illuminate the fundus, giving a very clear outline of the pupils. The instrument can be used either with or without the mirror, as the case demands.

So far as described it will be understood that the operator directs his vision through the eye-piece 2 centering on the apexes of the prisms 11 and 12.

On rotating the thumb-piece 24 the prism mountings 19 and 20 are moved in opposite directions. By moving the prisms 15 and 16 closer to the center the collected visual rays become closer together, and by separating the prisms 15 and 16 the collected rays become farther apart. The possibility of range of this measurement is limited only by the size and movement of the prisms. The reflected rays from the objects 27—28 via the patient's eyes being parallel, the measurement can be taken at any desired distance between the operator and the patient.

In using the instrument as above indicated, the operator looks through the instrument with one eye (the other eye being covered by the instrument or closed). The instrument is placed in line with the patient's eyes and the knob 24 is turned until both pupils are visible, the knob being rotated until the pupils are brought from overlapping position to one at which one pupil is completely over the other, at which instant the measurement is complete and can be read from the dial at the point of the indicator.

In Figure 8 is shown another modification of the invention using reflecting mirrors in lieu of prisms. Those parts in Figure 8 which correspond to similar parts in the previous figures bear the same reference numeral plus the index letter "c". In this embodiment of the invention the mirrors 15 and 16 are mounted on carriages 36—36 having threaded lugs 36x to engage the reversely threaded worm shaft 32c and the mirrors 13c—14c are mounted on a suitable body which is adjustable toward and from the eye-piece 2c by means of a screw device 37. It is thought that the operation of this embodiment of the invention will be obvious to those skilled in the art and a detailed description is therefore thought to be unnecessary.

While I have illustrated a number of modifications of the invention it is obvious that other modifications can be made without departing from the spirit of the invention or the scope of the appended claims.

What I claim is:

1. A pupil-distance meter, comprising an eye-piece through which the visual rays pass, means to collect the visual rays laterally and pass them through the eye-piece, means to receive as two parallel rays the visual rays from a patient's eyes, means to adjust the distance between the parallel rays to register with the pupils of the patient's eyes, and means to indicate the distances between the parallel rays, said receiving and collecting means comprising a system of stationary and movable light deflecting elements and said adjusting means comprising elements connected with said movable elements to move them simultaneously toward and from each other and the mid-plane between them by equal measurements.

2. In a pupil-distance meter, a box having a front and a back, the front having a central opening provided with an eye-piece, the back having two laterally spaced openings equidistant from the center of the back and spaced for alignment with the eyes of the patient, light deflecting means in the box for directing the rays of light entering the openings in the back into the eye-piece in the front, a main plate mounted within the box between the front and the back on which main plate said light deflecting means is mounted, and means for adjusting the light deflecting means to adjust the distance by equal amounts between the entering rays and the mid-plane between them.

3. In a pupil-distance meter, a box having a front and a back, the front having a central opening provided with an eye-piece, the back having two laterally spaced openings equidistant from the center of the back and spaced for alignment with the eyes of the patient, light deflecting means in the box for directing the rays of light entering the openings in the back into the eye-piece in the front, a main plate mounted within the box between the front and back thereof on which main plate said light deflecting means is mounted, and means for adjusting the light deflecting means to adjust the distance by equal amounts between the entering rays and the mid-plane between them, said light deflecting means comprising fixed prisms and movable light deflecting elements and said adjusting means comprising elements to move said movable elements toward and from the central line of the box by equal amounts.

4. In a pupil-distance meter, a box having a front wall and a back wall, the front wall having a central opening provided with an eye-piece, the back wall having two laterally spaced openings equidistant from the center of the back wall and spaced for alignment with the eyes of a patient, light deflecting means is mounted, means for adjusting the rays of light entering the openings in the back wall into the eye-piece in the front wall, a main plate mounted within the box between the front and back walls on which main plate said light deflecting means is mounted, means for adjusting the light deflecting means to adjust the distance by equal amounts between the entering rays and the mid-plane between them, and means on the outside of the box to indicate the distance between the parallel rays.

5. In a pupil-distance meter, a box having a front and a back, the front having a central opening provided with an eye-piece, the back having two laterally spaced openings equidistant from the center of the back and spaced for alignment with the eyes of the patient, light deflecting means in the box for directing the rays of light entering the openings in the back into the eye-piece in the front, a main plate mounted within the box between the front and back thereof on which main plate said light deflecting means is mounted, and means for adjusting the light deflecting means to adjust the distance by equal amounts between the entering rays and the mid-plane between them, said light deflecting means comprising fixed prisms and movable light deflecting elements and said adjusting means comprising elements to move said movable elements toward and from the central line of the box by equal amounts, and means on the outside of the box to indicate the distance between the parallel rays.

6. A pupil-distance meter, comprising a box having a central front opening and two laterally spaced back openings, a main plate dividing the box into a front compartment and a rear compartment, a pair of visual-ray-collecting prisms mounted on said plate in the front compartment in line with said front opening, said plate having openings, a pair of return prisms located side by side in the rear compartment with abutting faces in the central line of the instrument, means to hold said return prisms immovably in place, a pair of movably mounted return prisms in the front compartment, laterally spaced apart equidistant from the central line of the instrument, means to hold said movable prisms in place against said main plate, a pair of refracting prisms for changing parallel rays received though said back openings respectively into converging rays and passing them to said movable prisms, and means to move said movable prisms toward and from the central line of the instrument by equal amounts and indicating the same on the outside of the box.

7. A pupil-distance meter, comprising a box having a central front opening and two laterally spaced back openings, a main plate dividing the box into a front compartment and a rear compartment, a pair of visual-ray-collecting prisms mounted on said plate in the front compartment in line with said front opening, said plate having openings, a pair of return prisms located side by side in the rear compartment with abutting faces in the central line of the instrument, means to hold said return prisms immovably in place, a pair of movably mounted return prisms in the front compartment, laterally spaced apart equidistant from the central line of the instrument, means to hold said movable prisms in place against said main plate, a pair of refracting prisms for changing parallel rays received through said back openings respectively into converging rays and passing them to said movable prisms, and means to move said movable prisms toward and from the central line of the instrument by equal amounts and indicating the same on the outside of the box, said moving means comprising a shaft, prism carriers and power transmitting connections between said shaft and carrier.

8. A pupil-distance meter, comprising a box having a central front opening and two laterally spaced back openings, a main plate dividing the box into a front compartment and a rear compartment, a pair of visual-ray-collecting prisms mounted on said plate in the front compartment in line with said front opening, said plate having a central opening through which the collected rays are passed, central mirrors in the back compartment, and laterally spaced apart movable mirrors cooperating with said central mirrors to receive the rays from the back openings and direct them toward said front opening, and prisms over said back openings for turning the rays from parallelism before they reach said movable mirrors, and means to adjust said movable mirrors toward and from each other and indicate the adjustment on the outside of the box.

9. A pupil-distance meter, comprising a box having a central front opening and two laterally spaced back openings, a main plate dividing the box into a front compartment and a rear compartment, a pair of visual-ray-collecting prisms mounted on said plate in the front compartment in line with said front opening, said plate having a central opening through which the collected rays are passed, central mirrors in the back compartment, and laterally spaced apart movable mirrors cooperating with said central mirrors to receive the rays from the back openings and direct them toward said front opening, prisms over said back openings, means to adjust said movable mirrors toward and from each other and indicate the adjustment on the outside of the box, and means to adjust the central mirrors as a unit toward and from said central opening along the central line of the box.

GURNEY LEE MANDAVILLE.